US009676092B2

(12) United States Patent
Kumagai (10) Patent No.: US 9,676,092 B2
(45) Date of Patent: Jun. 13, 2017

(54) ELECTRIC POWER TOOL (71) Applicant: MAKITA CORPORATION, Anjo-shi, Aichi (JP)

(72) Inventor: Ryunosuke Kumagai, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 468 days.

(21) Appl. No.: 14/373,228

(22) PCT Filed: Dec. 6, 2012

(86) PCT No.: PCT/JP2012/081650
§ 371 (c)(1),
(2) Date: Jul. 18, 2014

(87) PCT Pub. No.: WO2013/125129
PCT Pub. Date: Aug. 29, 2013

(65) Prior Publication Data
US 2015/0027743 A1 Jan. 29, 2015

(30) Foreign Application Priority Data

Feb. 22, 2012 (JP) ................................. 2012-036472

(51) Int. Cl.
*B25F 5/00* (2006.01)
*H02K 5/20* (2006.01)
(Continued)

(52) U.S. Cl.
CPC ............... *B25F 5/008* (2013.01); *B25F 5/02* (2013.01); *H02K 5/20* (2013.01); *H02K 9/06* (2013.01); *H02K 9/26* (2013.01); *H02K 7/145* (2013.01)

(58) Field of Classification Search
CPC .. H02K 5/10; H02K 5/12; H02K 7/14; H02K 9/06; H02K 9/22; H02K 9/26; H02K 9/28;
(Continued)

(56) References Cited

U.S. PATENT DOCUMENTS 4,748,358 A * 5/1988 Ruhle ..................... H02K 1/17
310/154.15
5,767,596 A * 6/1998 Stark ........................ H02K 5/00
29/596
(Continued)

FOREIGN PATENT DOCUMENTS

CN       1666845 A      9/2005
CN     101318317 A     12/2008
(Continued)

OTHER PUBLICATIONS

May 6, 2015 Office Action issued in Chinese Application No. 201280069388.X.
(Continued)

*Primary Examiner* — Scott A. Smith
(74) *Attorney, Agent, or Firm* — Oliff PLC (57) ABSTRACT An electric power tool capable of suppressing damage to a fan housed in a housing to cool a motor due to foreign matter without increasing the number of parts. An impact driver includes a motor, a centrifugal fan attached to an output shaft of the motor to cool the motor, an annular air collecting member disposed between the motor and the centrifugal fan to collect cooling air by the centrifugal fan, a housing that houses the motor, the centrifugal fan, and the air collecting member, and ventilation windows formed in the housing to communicate between the inside and the outside of the housing on the outer side of the centrifugal fan. The air
(Continued)

collecting member is provided with wall bodies positioned on the inner side of the ventilation windows.

14 Claims, 5 Drawing Sheets

(51) Int. Cl.
*H02K 9/06* (2006.01)
*H02K 9/26* (2006.01)
*B25F 5/02* (2006.01)
*H02K 7/14* (2006.01)

(58) Field of Classification Search
CPC .... H02K 5/04; H02K 5/20; B25F 5/00; B25F 5/02; B25F 5/008
USPC ...... 173/217, 169, 170, 171; 310/50, 52, 71, 310/88, 154.01, 154.15, 239, 58, 89; 451/344, 359, 355, 449
See application file for complete search history.

(56) References Cited

U.S. PATENT DOCUMENTS

| | | | |
|---|---|---|---|
| 6,661,148 B2* | 12/2003 | Oomori | H02K 9/06 310/239 |
| 7,375,447 B2* | 5/2008 | Oomori | B25F 5/008 310/154.01 |
| 8,123,596 B2* | 2/2012 | Kobayashi | B25F 5/008 451/344 |
| 2002/0182020 A1* | 12/2002 | Oomori | H02K 9/06 408/124 |
| 2005/0200215 A1 | 9/2005 | Oomori et al. | |
| 2008/0305728 A1 | 12/2008 | Kobayashi et al. | |

FOREIGN PATENT DOCUMENTS

| | | |
|---|---|---|
| JP | A-64-40258 | 3/1989 |
| JP | A-2005-254376 | 9/2005 |
| JP | A-2008-302467 | 12/2008 |
| JP | A-2010-36260 | 2/2010 |

OTHER PUBLICATIONS

International Search Report issued in International Application No. PCT/JP2012/081650 mailed Mar. 12, 2013.

* cited by examiner

ELECTRIC POWER TOOL

TECHNICAL FIELD

The present invention relates to an electric power tool that includes a motor, a centrifugal fan that cools the motor, an annular air collecting member that collects cooling air by the centrifugal fan, a housing that houses the motor, the centrifugal fan, and the air collecting member, and a ventilation window formed in the housing to communicate between the inside and the outside of the housing on the outer side of the centrifugal fan.

BACKGROUND ART

Patent Document 1, for example, discloses an electric power tool in which suction ports for cooling air for a motor are formed in an end surface of a housing of the electric power tool, striped penetrating portions are provided at positions at which the penetrating portions are not aligned with the suction ports in a tail cover mounted to the end surface, and a gap is provided between the end surface and the tail cover. With the electric power tool according to Patent Document 1, the dimension of the gap between the end surface of the housing and the tail cover is smaller than the size of crushed pieces of concrete. Thus, the crushed pieces can be prevented from passing through the gap to intrude into the housing through the suction ports for cooling air. In addition, a passage for cooling air can be formed to extend from the striped penetrating portions of the tail cover to the suction ports via the gap.

Patent Document 2 discloses an electric power tool in which a rear housing provided with a plurality of ventilation windows is screwed to the rear of a housing that houses a motor, a fan that cools the motor, etc., and filters are provided at the positions of the ventilation windows on the inner surface of the rear housing. With the electric power tool according to Patent Document 2, the filters which are permeable to air and waterproof can prevent water droplets and dust particles from intruding into the housing and cooling air for the motor can be taken into the housing through the ventilation windows. This prevents the fan housed in the housing from being damaged by foreign matter such as dust particles.

PRIOR ART DOCUMENTS

Patent Documents

[Patent Document 1] Japanese Utility Model Application Publication No. 64-40258 (JP 64-40258 U)
[Patent Document 2] Japanese Patent Application Publication No. 2010-36260 (JP 2010-36260 A)

SUMMARY OF THE INVENTION

Technical Problem

In order to prevent foreign matter such as crushed pieces and dust particles from intruding into the housing, however, the electric power tool according to Patent Document 1 requires the tail cover besides the housing, which disadvantageously increases the number of parts required to assemble the electric power tool. In order to prevent the fan housed in the housing from being damaged by foreign matter, the electric power tool according to Patent Document 2 also requires the filter which is a part that is separate from the housing, which disadvantageously increases the number of parts as in Patent Document 1.

The present invention has been proposed in view of such circumstances, and therefore has an object to provide an electric power tool capable of suppressing damage to a fan that cools a motor housed in a housing due to foreign matter without increasing the number of parts.

Solution to Problem

The invention according to claim 1 provides an electric power tool characterized by including
 a housing,
 a motor housed in the housing,
 a centrifugal fan housed in the housing and attached to an output shaft of the motor to cool the motor,
 an annular air collecting member housed in the housing and disposed between the motor and the centrifugal fan to collect cooling air by the centrifugal fan,
 a ventilation window formed in the housing to communicate between inside and outside of the housing on an outer side of the centrifugal fan and
 a wall body provided on the air collecting member and positioned on an inner side of the ventilation window.

The invention according to claim 2 provides the electric power tool according to claim 1, in which the housing is formed with a plurality of the ventilation windows arranged in a circumferential direction of the housing. Further, the air collecting member is provided with the wall bodies arranged in a comb-teeth shape in which the wall bodies are arranged in a circumferential direction of the air collecting member with slits interposed between the wall bodies.

The invention according to claim 3 provides the electric power tool according to claim 2, in which the wall bodies project beyond apex portions of blades of the centrifugal fan from the air collecting member in the axial direction of the output shaft. Further, the slits are disposed at positions at which the slits overlap the centrifugal fan.

The invention according to claim 4 provides the electric power tool according to claim 2, in which a gap between an inner wall of the housing and the wall bodies is set to be constant in the circumferential direction of the housing.

The invention according to claim 5 provides the electric power tool according to claim 2, in which a gap between an inner wall of the housing and the wall bodies is set to be constant in the axial direction of the output shaft.

The invention according to claim 6 provides the electric power tool according to claim 1, in which the air collecting member and the wall body are made of metal, and the wall body is formed integrally with the air collecting member.

Advantageous Effects of the Invention

With the electric power tool according to the invention according to claim 1, the centrifugal fan housed in the housing does not directly face the ventilation window by the wall body in a direction that is generally orthogonal to the housing. Hence, foreign matter that has intruded through the ventilation window can be prevented from directly hitting the centrifugal fan so that damage to the centrifugal fan due to foreign matter can be suppressed. Moreover, the wall body is provided on the air collecting member, and therefore it is not necessary to prepare the wall body and the air collecting member separately. Thus, an increase in number of parts required to assemble the electric power tool can be prevented.

With the invention according to claim 2, also in the case where the plurality of the ventilation windows are formed in the housing, the centrifugal fan does not directly face the ventilation windows by the wall bodies arranged in a comb-teeth shape. Consequently, damage to the centrifugal fan due to foreign matter can be suppressed.

With the invention according to claim 3, the cooling air blown in centrifugal directions by the centrifugal fan can be guided to the slits along the wall bodies, and thereafter led to the ventilation windows positioned on the outer side of the centrifugal fan. Hence, the cooling air can be easily discharged through the ventilation windows.

With the invention according to claim 4, resistance to the cooling air which flows between the inner wall of the housing and the wall bodies in the circumferential direction of the housing can be reduced. Consequently, the flow of the cooling air is smoothed.

With the invention according to claim 5, resistance to the cooling air which flows between the inner wall of the housing and the wall bodies in the axial direction of the output shaft of the motor can be reduced. Consequently, the flow of the cooling air is smoothed.

With the invention according to claim 6, thermal conductivity of the air collecting member and thermal conductivity of the wall body can be improved. Therefore, heat generated by the motor can be immediately transferred to the air collecting member and the wall body so that the heat is easily released to the outside of the air collecting member and the outside of the wall body. In addition, the air collecting member and the wall body can be cooled with the cooling air collected by the air collecting member. Thus, a heat releasing effect of the air collecting member and the wall body can be further improved.

DESCRIPTION OF EMBODIMENTS

Figure 1:
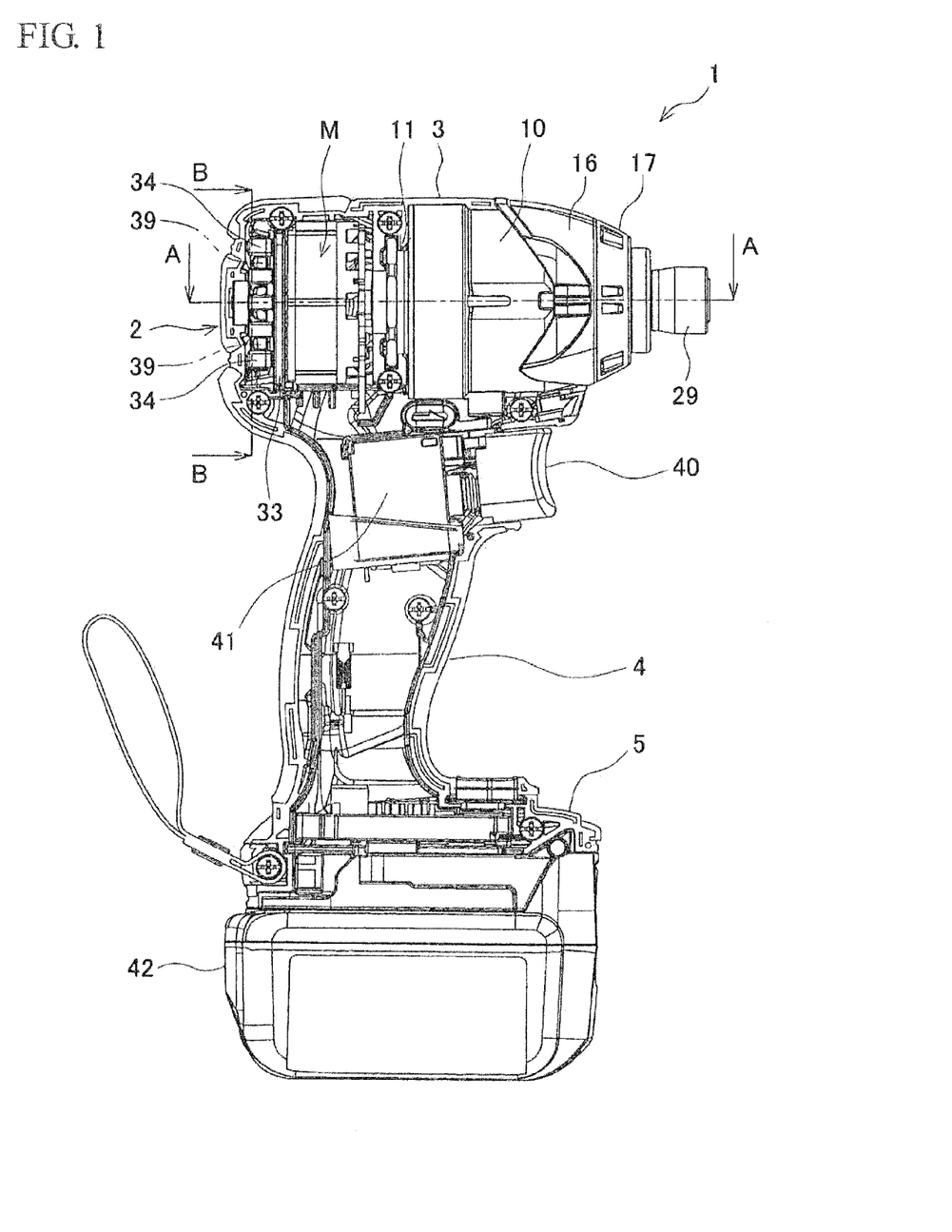
FIG. 1 illustrates an internal structure of an impact driver according to an embodiment of the present invention.
Figure 2:
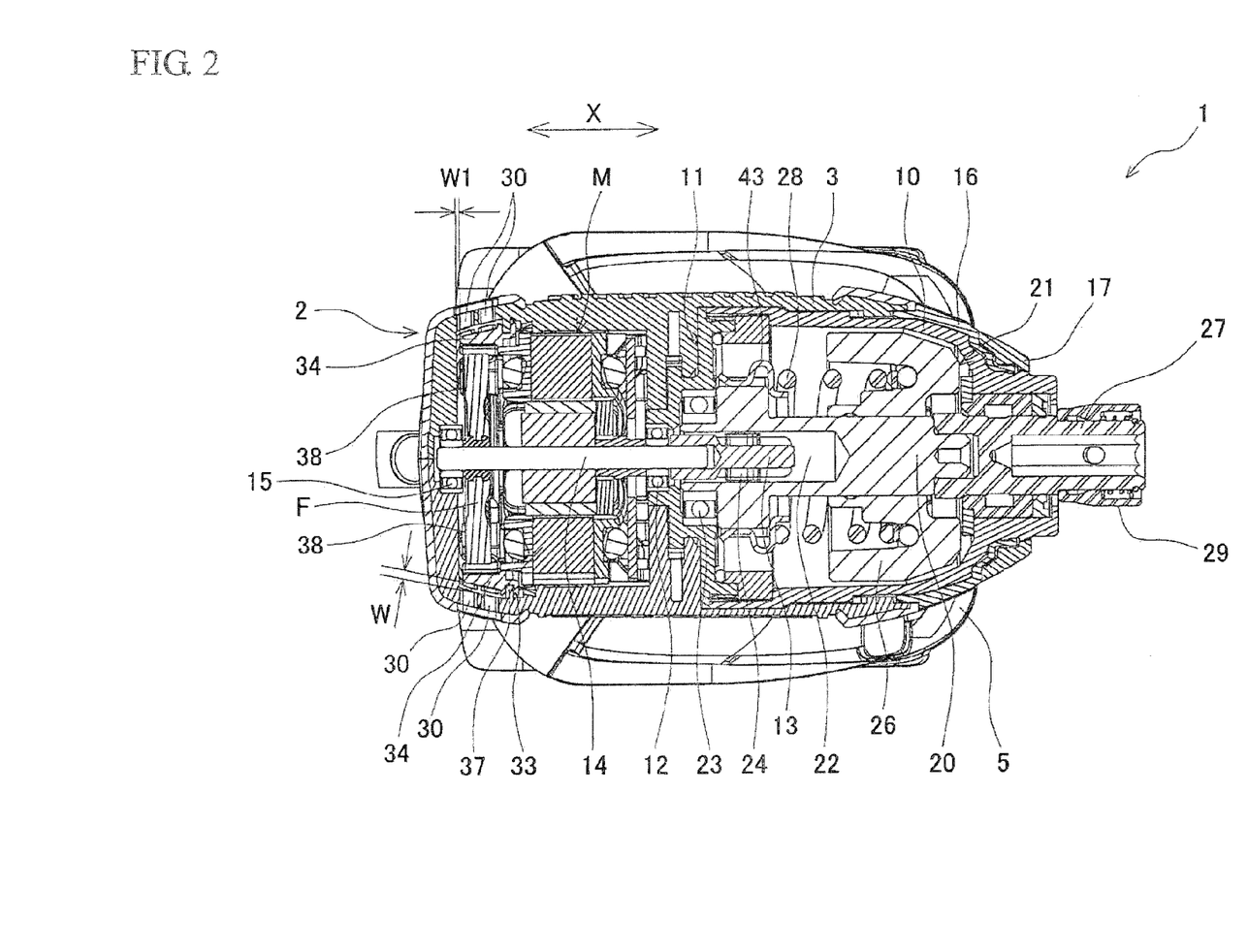
FIG. 2 is a sectional view taken along line AA in FIG. 1.

An embodiment of the present invention will be described with reference to FIGS. 1 to 5. As illustrated in FIGS. 1 and 2, an impact driver 1 includes a housing 2. The housing 2 is formed by assembling left and right half housings made of a resin, and includes a body portion 3, a handle portion 4, and a battery pack mounting portion 5. The impact driver 1 is an example of the electric power tool according to the present invention.

The body portion 3 is formed in a cylindrical shape to extend in the front-rear direction of the impact driver 1 (in the left-right direction in FIGS. 1 and 2). A hammer case 10 is assembled to a front (right side in FIGS. 1 and 2) of the inside of the body portion 3. A motor M is housed in a rear (left side in FIGS. 1 and 2) of the inside of the body portion 3. The hammer case 10 is formed from metal (for example, aluminum) as a tubular body with a shape similar to that of a hanging bell. A bearing box 11 is integrally coupled to an opening portion at the rear end of the hammer case 10. The bearing box 11 contains ball bearings 12 and 23 (see FIG. 2). As illustrated in FIG. 2, an output shaft 14 of the motor M, to which a pinion 13 is mounted, is inserted into the hammer case 10. The output shaft 14 is supported by the ball bearing 12 and a ball bearing 15 so as to be rotatable. A cover 16 and a bumper 17 are mounted to a portion of a front outer periphery of the hammer case 10 that is exposed from the body portion 3.

As illustrated in FIG. 2, a spindle 20 and an impact mechanism 21 are housed in the hammer case 10. The spindle 20 is housed in the hammer case 10 coaxially with the hammer case 10. A hollow portion 22 is formed at the rear end of the spindle 20. An outer periphery of the rear end of the spindle 20 is supported by the ball bearing 23 held in the bearing box 11 so that the spindle 20 is rotatable. In addition, the pinion 13 is inserted into the hollow portion 22. The pinion 13 meshes with planetary gears 24 and 24 exposed in the hollow portion 22.

The impact mechanism 21 includes a hammer 26, an anvil 27, and a coil spring 28. The hammer 26 is coupled so as to be rotatable together with the spindle 20 and movable in the axial direction of the spindle 20. The anvil 27 is rotatably supported and is coaxial with the hammer 26 in front of the hammer 26. A chuck 29 to which a bit is mountable is provided at the distal end of the anvil 27. The coil spring 28 is fitted with an outer periphery of a plate 43 externally mounted to the spindle 20 to bias the hammer 26 to an advanced position at which the hammer 26 is engaged with the anvil 27.

Figure 3:
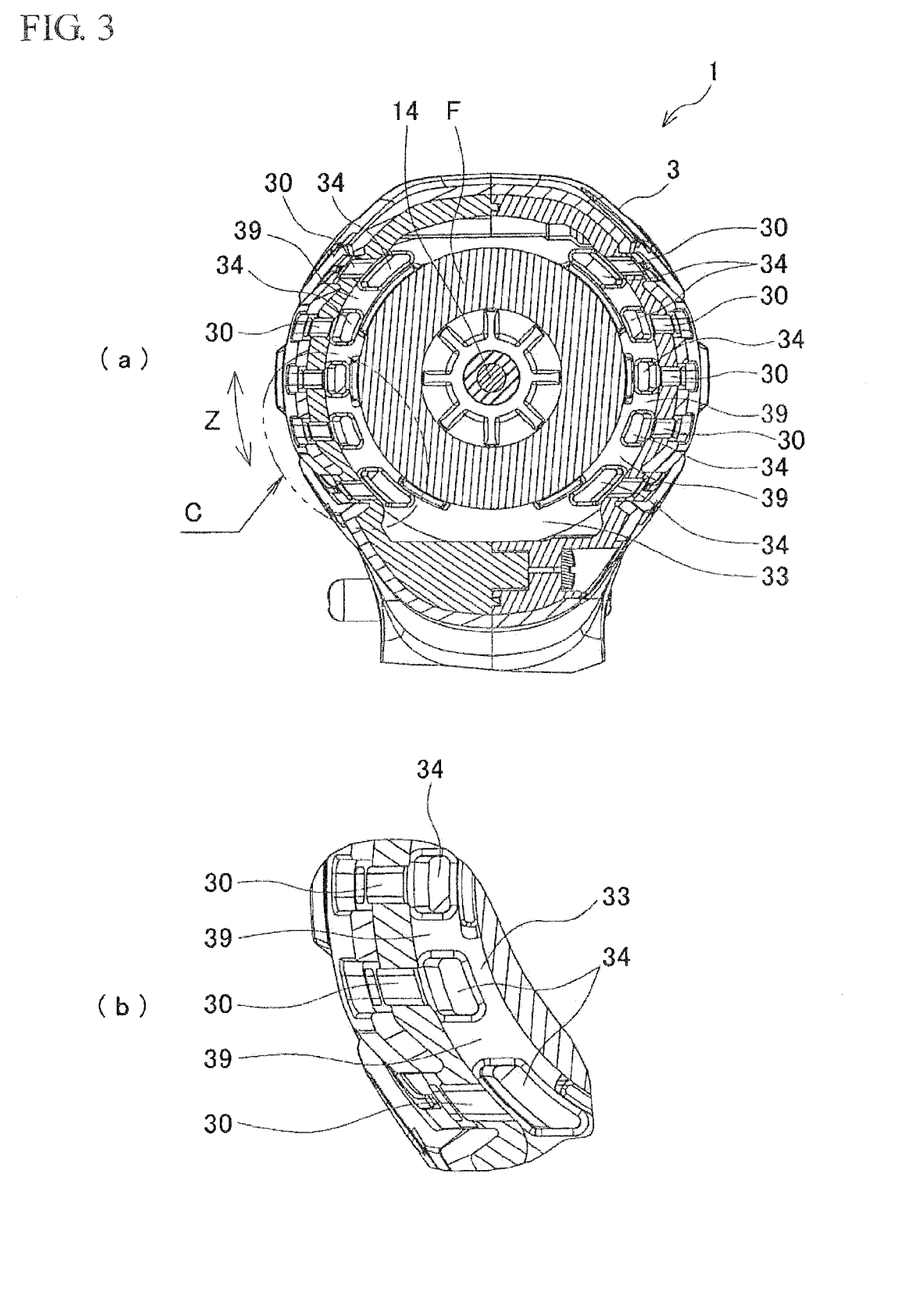
FIG. 3(a) is a sectional view taken along line B-B in FIG. 1.
FIG. 3(b) is an enlarged view of a C portion in FIG. 3(a).
Figure 4:
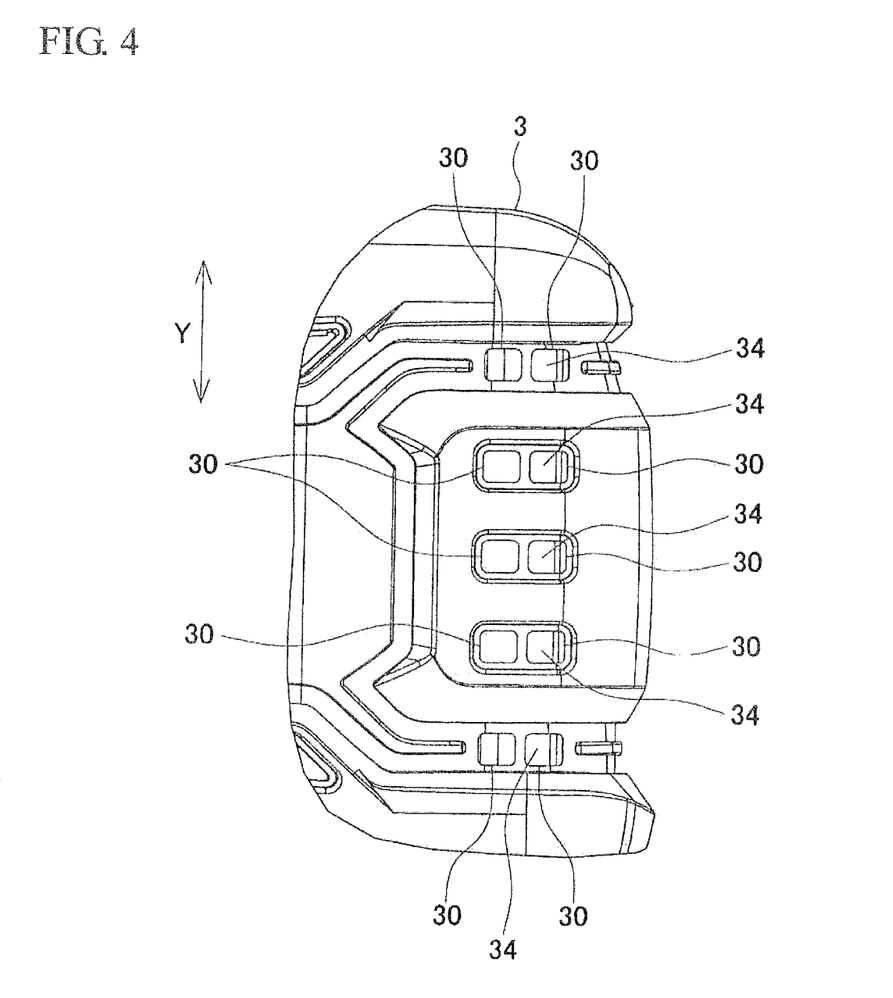
FIG. 4 is an enlarged view illustrating the area around ventilation windows in a housing of the impact driver.

As illustrated in FIG. 2, on the rear end side of the output shaft 14 of the motor M, a centrifugal fan F is attached to the outer peripheral surface of the output shaft 14. As illustrated in FIGS. 2 to 4, a plurality of the ventilation windows 30 are formed in left and right side surfaces of the body portion 3 on the outer side of the centrifugal fan F to communicate between the inside and the outside of the body portion 3. In the embodiment, the plurality of the ventilation windows 30 are arranged in two lines in the front-rear direction at predetermined intervals in the circumferential direction Y (see FIG. 4) of the body portion 3 in the left and right side surfaces of the body portion 3. Here, as illustrated in FIG. 4, five ventilation windows are formed in a first line, and five ventilation windows are formed in a second line. The first line of the ventilation windows 30 and the second line of the ventilation windows 30 are formed in the left and right side surfaces at the same positions in the circumferential direction Y (positions in the height direction of the body portion 3).

Figure 5:
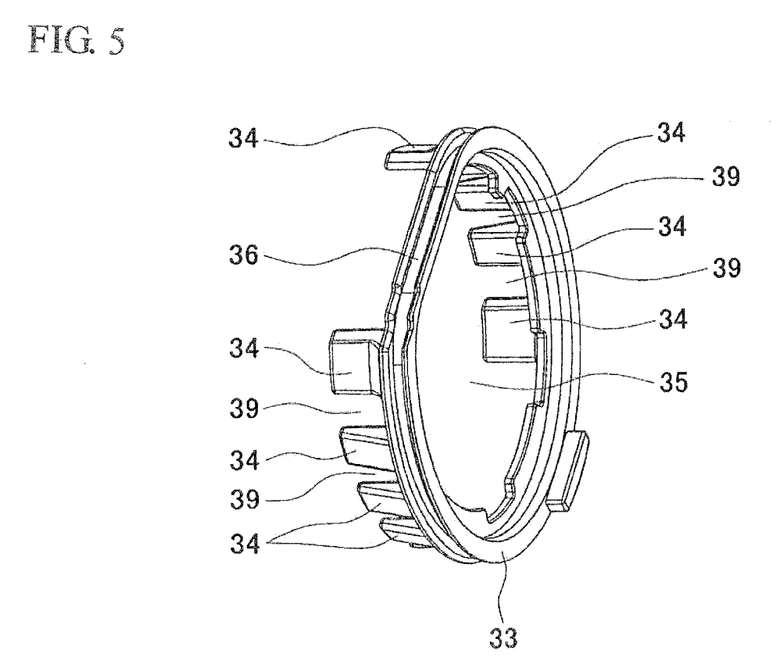
FIG. 5 is an overall perspective view of a fan guide of the impact driver.

As illustrated in FIGS. 1 and 2, a fan guide 33 that serves as an air collecting member is disposed in the body portion 3 between the centrifugal fan F and the motor M in the front-rear direction of the body portion 3. The fan guide 33 is made of a resin, and shaped to be annular as illustrated in FIG. 5. The fan guide 33 is provided with a wall body 34. The fan guide 33 is larger in diameter than the centrifugal fan F. The space inside the fan guide 33 serves as a ventilation hole 35. Further, a rib guiding groove 36 (see FIG. 5) is provided to extend over the entire circumference of the fan guide 33. The rib guiding groove 36 is engaged with a rib 37 (see FIG. 2) that has a thin plate shape and that projects over the entire circumference of the inner wall of the body portion 3. This allows the fan guide 33 to be positioned in the body portion 3.

In addition, a plurality of such wall bodies 34 are provided to project to the rear of the output shaft 14 in the axial direction X from a rear surface of the fan guide 33 (left side in FIGS. 2 and 5). In the embodiment, the wall bodies 34 are each made of a resin, and formed integrally with the fan guide 33. As illustrated in FIG. 3(a), five wall bodies 34 are provided at predetermined intervals in the circumferential direction Z of the fan guide 33 to project from the rear surface of the left half of the fan guide 33. In addition, five wall bodies 34 are provided at the predetermined intervals in the circumferential direction Z of the fan guide 33 to project from the rear surface of the right half of the fan guide 33. As illustrated in FIGS. 2 and 4, the wall bodies 34 are each disposed on the outer side of the centrifugal fan F. The wall bodies 34 face the inner sides of the two lines of the ventilation windows 30 and 30 provided at the same positions in the circumferential direction Y of the body portion 3 (positions in the height direction of the body portion 3), with a gap between the ventilation windows 30 and the wall bodies 34. Therefore, as illustrated in FIG. 4, the centrifugal fan F does not directly face the ventilation windows 30 in a direction that is generally orthogonal to the body portion 3.

Further, as illustrated in FIG. 2, the projecting length of the wall bodies 34 is set such that the wall bodies 34 extend beyond apex portions of blades 38 of the centrifugal fan F from the rear surface of the fan guide 33 in the axial direction X. As a result, slits 39 (see FIGS. 3B and 5) that are elongated in the axial direction X are formed between the wall bodies 34 that are adjacent to each other in the circumferential direction Z of the fan guide 33. Thus, as illustrated in FIG. 5, a comb-teeth shape in which the five wall bodies 34 are arranged in the circumferential direction Z with the slits 39 interposed between the wall bodies 34 is formed when the fan guide 33 is viewed from a side. As can be understood from FIGS. 1 and 3, the slits 39 are disposed at positions at which the slits 39 overlap the centrifugal fan F when the centrifugal fan F and the slits 39 are viewed from a side. As illustrated in FIGS. 3A and 3B, side surfaces of the wall bodies 34 have an arcuate shape that matches the shape of an inner wall surface of the body portion 3. With outer side surfaces of the wall bodies 34 and the inner wall of the body portion 3 disposed to face each other with a gap W between the wall bodies 34 and the body portion 3 as illustrated in FIG. 2, the dimension of the gap W can be set to be constant in the circumferential direction Y of the body portion 3 (see FIG. 4). In the embodiment, the dimension of the gap W is set to about 1 mm. In addition, the rear end surfaces of the wall bodies 34 are shaped to extend linearly in parallel with the rear end side of the inner wall surface of the body portion 3. With the rear end surfaces of the wall bodies 34 and the inner wall of the body portion 3 on the rear end side disposed to face each other with a gap W1 between the wall bodies 34 and the body portion 3 as illustrated in FIG. 2, the dimension of the gap W1 can be set to be constant in the axial direction X (see FIG. 2).

On the other hand, as illustrated in FIG. 1, the handle portion 4 is provided to extend downward from the body portion 3 as viewed from a side of the impact driver 1. A switch 41 having a trigger 40 is housed inside the handle portion 4. The battery pack mounting portion 5 is formed at a lower end of the handle portion 4. A battery pack 42 is removably mounted to the battery pack mounting portion 5. When an operator presses the trigger 40 into the handle portion 4 to turn the switch 41 on, the battery pack 42 supplies electricity to the motor M.

Next, operation of the impact driver 1 according to the embodiment will be described. When the trigger 40 illustrated in FIG. 1 is pressed into the handle portion 4, the motor M is driven to rotate the spindle 20 illustrated in FIG. 2. The anvil 27 is rotated via the hammer 26, which enables a bit mounted to the anvil 27 to tighten a screw. When load on the anvil 27 is increased along with a screw tightening work, the hammer 26 is retracted against bias of the coil spring 28 illustrated in FIG. 2 to be disengaged from the anvil 27. At the same time, the bias of the coil spring 28 causes the hammer 26 to advance and rotate together with the spindle 20 to be reengaged with the anvil 27. Such repeated engagement and disengagement applies an intermittent impact in the rotational direction to the anvil 27, which enables the screw to be tightened additionally.

When the centrifugal fan F is rotated along with rotation of the output shaft 14 of the motor M, cooling air is introduced into the body portion 3 through suction ports (not illustrated) provided in the left and right side surfaces of the body portion 3. Then, the cooling air is taken into the motor M through an air inlet port (not illustrated) of the motor M. After that, the cooling air flows inside the motor M, and is suctioned into the ventilation hole 35 (see FIG. 5) of the fan guide 33 to be collected at the centrifugal fan F. This allows the motor M to be cooled with the cooling air from the inside of the motor M. The cooling air collected at the centrifugal fan F is blown in the centrifugal directions which cross the axial direction X (see FIG. 2) of the output shaft 14 of the motor M, and is guided to the slits 39 (see FIGS. 3(a) and 3(b)) along the inner side surfaces of the wall bodies 34 (see FIGS. 3(a) and 3(b)). The cooling air guided to the slits 39 flows through the gap W (see FIG. 2), and thereafter is discharged to the outside of the body portion 3 through the ventilation windows 30. At this time, with the dimension of the gap W set to be constant in the circumferential direction Y of the body portion 3 (see FIG. 4), the resistance when the cooling air flows between the inner wall of the body portion 3 and the wall bodies 34 can be reduced. Hence, the flow of the cooling air is smoothed. In addition, the dimension of the gap W1 (see FIG. 2) is also set to be constant in the axial direction X (see FIG. 2), and therefore the resistance when the cooling air collected at the centrifugal fan F flows between the inner wall of the body portion 3 on the rear end side and the rear end surface of the wall bodies 34 can be reduced. Hence, the flow of the cooling air between the inner wall and the rear end surface is also smoothed.

In the embodiment, further, as illustrated in FIGS. 2 to 4, the wall bodies 34 are disposed on the outer side of the centrifugal fan F to face the ventilation windows 30. Thus, the centrifugal fan F does not directly face the ventilation windows 30 when seeing through the ventilation windows 30 from a location outside the body portion 3 in a direction that is generally orthogonal to the body portion 3. Thus, even in the case where foreign matter such as dust particles intrudes into the body portion 3 through the ventilation windows 30, such foreign matter can be prevented from directly hitting the centrifugal fan F. Hence, damage to the centrifugal fan F due to foreign matter can be suppressed.

Effects of Embodiment

With the impact driver 1 according to the embodiment, the centrifugal fan F housed in the body portion 3 does not face the ventilation windows 30 when seeing through the ventilation windows 30 from a location outside the body portion 3 in a direction that is generally orthogonal to the body portion 3 by the wall bodies 34. Hence, foreign matter that has intruded into the body portion 3 through the ventilation windows 30 can be prevented from directly hitting the centrifugal fan F. Hence, damage to the centrifugal fan F due to foreign matter can be suppressed. Moreover, the wall bodies 34 are provided on the fan guide 33, and therefore it is not necessary to prepare the wall bodies 34 and the fan guide 33 separately. Thus, an increase in number of parts required to assemble the impact driver 1 can be prevented.

The plurality of the wall bodies 34 are arranged in a comb-teeth shape in the circumferential direction Z of the fan guide 33 with the slits 39 interposed between the wall bodies 34 to face the inner sides of the ventilation windows 30. Thus, in the case where the body portion 3 is provided with the plurality of the ventilation windows 30 arranged in two lines in the front-rear direction as illustrated in FIG. 4, the centrifugal fan F does not face the ventilation windows 30 through the ventilation windows 30 from a location outside the body portion 3 in a direction that is generally orthogonal to the body portion 3. Consequently, damage to the centrifugal fan F due to foreign matter can be suppressed.

Further, the slits 39 are disposed at positions at which the slits 39 overlap the centrifugal fan F when the centrifugal fan F and the slits 39 are viewed from a side. Therefore, the cooling air blown in centrifugal directions by the centrifugal fan F can be guided to the slits 39 along the inner side surfaces of the wall bodies 34, and thereafter led to the ventilation windows 30 positioned on the outer side of the centrifugal fan F. Hence, the cooling air can be easily discharged through the ventilation windows 30.

In addition, with the dimension of the gap W between the outer side surfaces of the wall bodies 34 and the inner wall of the body portion 3 set to be constant in the circumferential direction Y of the body portion 3, the resistance to the cooling air which flows between the inner wall and the wall bodies 34 can be reduced. Consequently, the flow of the cooling air is smoothed. Moreover, with the dimension of the gap W1 between the rear end surface of the wall bodies 34 and the inner wall of the body portion 3 on the rear end side set to be constant in the axial direction X, the resistance to the cooling air which flows between the inner wall on the rear end side and the rear end surface of the wall bodies 34 can also be reduced. Consequently, the flow of the cooling air between the inner wall on the rear end side and the rear end surface is also smoothed.

The present invention is not limited to the embodiment discussed above, and part of the configuration of the embodiment may be modified appropriately without departing from the gist of the present invention. For example, in the embodiment discussed above, the fan guide 33 and the wall bodies 34 are integrally formed from a resin. However, the present invention is not limited thereto, and the fan guide and the wall bodies may be integrally formed from metal such as iron or aluminum. In this case, the thermal conductivity of the fan guide and the thermal conductivity of the wall bodies can be improved, which allows heat generated by the motor M to be immediately transferred to the fan guide and the wall bodies. As a result, the heat is easily released to the outside of the fan guide and the outside of the wall bodies. In addition, the fan guide and the wall bodies can be cooled with the cooling air collected at the centrifugal fan F by the fan guide. Thus, a heat releasing effect of the fan guide and the wall bodies is further improved.

In the embodiment discussed above, the present invention is applied to an impact driver. However, the present invention is not limited thereto, and may be applied to an electric power tool such as a grinder.

DESCRIPTION OF THE REFERENCE NUMERALS

1 IMPACT DRIVER
2 HOUSING
3 BODY PORTION
14 OUTPUT SHAFT OF MOTOR
30 VENTILATION WINDOW
33 FAN GUIDE
34 WALL BODY
38 BLADE OF CENTRIFUGAL FAN
39 SLIT
F CENTRIFUGAL FAN
M MOTOR
W GAP BETWEEN OUTER SIDE SURFACES OF WALL BODIES AND INNER WALL OF BODY PORTION
X AXIAL DIRECTION OF OUTPUT SHAFT
Y CIRCUMFERENTIAL DIRECTION OF BODY PORTION
Z CIRCUMFERENTIAL DIRECTION OF FAN GUIDE

The invention claimed is:

1. An electric power tool comprising:
a housing;
a motor housed in the housing;
a centrifugal fan housed in the housing and attached to an output shaft of the motor to cool the motor;
an annular air collecting member housed in the housing and disposed between the motor and the centrifugal fan to collect cooling air by the centrifugal fan;
a plurality of ventilation windows formed in the housing on right and left sides of the power tool to communicate between inside and outside of the housing on an outer side of the centrifugal fan; and
a plurality of wall bodies provided on the air collecting member and positioned on an inner side of the plurality of ventilation windows, wherein
the plurality of wall bodies are separated by slits and form comb-like structures on each of the right and left sides of the power tool corresponding with the plurality of ventilation windows.

2. The electric power tool according to claim 1, wherein the ventilation windows are arranged in a circumferential direction of the housing, and the air collecting member is provided with the plurality of wall bodies arranged in a circumferential direction of the air collecting member with the plurality of slits interposed between the plurality of wall bodies.

3. The electric power tool according to claim 2, wherein the plurality of wall bodies project from the air collecting member beyond apex portions of blades of the centrifugal fan in an axial direction of the output shaft, and the plurality of slits are disposed at positions at which the plurality of slits overlap the centrifugal fan.

4. The electric power tool according to claim 3, wherein the plurality of the ventilation windows are arranged in a plurality of lines in the housing, and the plurality of wall bodies are positioned on an inner side of plurality of ventilation windows.

5. The electric power tool according to claim 2, wherein a gap between an inner wall of the housing and the plurality of wall bodies is set to be constant in the circumferential direction of the housing.

6. The electric power tool according to claim 2, wherein a gap between an inner wall of the housing and the plurality of wall bodies is set to be constant in an axial direction of the output shaft.

7. The electric power tool according to claim 1, wherein the air collecting member and the plurality of wall bodies are made of metal, and the plurality of wall bodies are formed integrally with the air collecting member.

8. The electric power tool according to claim 1, wherein the air collecting member is formed to be larger in diameter than the centrifugal fan, and a space inside the air collecting member serves as a ventilation hole for the cooling air.

9. The electric power tool according to claim 8, wherein a rib guiding groove is provided to extend over an entire circumference of the air collecting member, and a rib to be engaged with the rib guiding groove is provided to extend over an entire circumference of an inner wall of the housing.

10. The electric power tool according to claim 1, wherein the air collecting member and the plurality of wall bodies are made of a resin, and the plurality of wall bodies are formed integrally with the air collecting member.

11. The electric power tool according to claim 1, wherein the plurality of wall bodies are between the centrifugal fan and the plurality of ventilation windows in a direction orthogonal to an axial direction of the output shaft.

12. The electric power tool according to claim 11, wherein the plurality of wall bodies are configured to guide air blown in centrifugal directions from the centrifugal fan toward the plurality of slits before the air is discharged through the plurality of ventilation windows to the outside of the housing.

13. The electric power tool according to claim 1, wherein the annular air collecting member comprises an annular fan guide, and the plurality of wall bodies extend rearwardly from a rear surface of the annular fan guide in an axial direction of the output shaft, the plurality of wall bodies being spaced apart by the plurality of slits in a circumferential direction relative to the axial direction of the output shaft.

14. The electric power tool according to claim 13, wherein an inner surface of the annular fan guide defines a ventilation hole.

* * * * *